United States Patent
Inoue et al.

(10) Patent No.: US 10,371,259 B2
(45) Date of Patent: Aug. 6, 2019

(54) CONTROL DEVICE FOR CONTINUOUSLY VARIABLE TRANSMISSION EQUIPPED WITH AUXILIARY TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Mamiko Inoue, Ebina (JP); Takuichiro Inoue, Yamato (JP); Hiroyasu Tanaka, Atsugi (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 658 days.

(21) Appl. No.: 15/021,451

(22) PCT Filed: Sep. 24, 2014

(86) PCT No.: PCT/JP2014/075172
§ 371 (c)(1),
(2) Date: Mar. 11, 2016

(87) PCT Pub. No.: WO2015/053073
PCT Pub. Date: Apr. 16, 2015

(65) Prior Publication Data
US 2016/0223081 A1    Aug. 4, 2016

(30) Foreign Application Priority Data
Oct. 8, 2013 (JP) .................................. 2013-210903

(51) Int. Cl.
*F16H 61/70* (2006.01)
*F16H 61/08* (2006.01)
(Continued)

(52) U.S. Cl.
CPC ........... *F16H 61/70* (2013.01); *F16H 37/021* (2013.01); *F16H 61/08* (2013.01); *F16H 61/702* (2013.01); *F16H 61/662* (2013.01)

(58) Field of Classification Search
CPC ...... F16H 37/021; F16H 61/08; F16H 61/662; F16H 61/70; F16H 61/702
(Continued)

(56) References Cited

U.S. PATENT DOCUMENTS

| 4,458,558 A | 7/1984 | Frank |
| 4,504,247 A | 3/1985 | Chana et al. |

(Continued)

FOREIGN PATENT DOCUMENTS

| JP | H05-79554 A | 3/1993 |
| JP | 2011-021718 A | 2/2011 |
| JP | 2012-057702 A | 2/2012 |

OTHER PUBLICATIONS

Non-Final Office Action issued in corresponding U.S. Appl. No. 15/021,439 dated Jan. 22, 2018, 9 pages.
(Continued)

*Primary Examiner* — William C Joyce
(74) *Attorney, Agent, or Firm* — Foley & Lardner LLP

(57) ABSTRACT

A control device for a continuously variable transmission with an auxiliary transmission includes: a cooperative control section being configured to shift the auxiliary transmission mechanism during the first inertia phase time period, and to shift the variator during the second inertia phase time period, when the cooperative control in which an input torque to the continuously variable transmission is equal to or smaller than a predetermined value in the cooperative control is judged, and being configured to shift the auxiliary transmission mechanism during the first inertia phase time period, and to shift the variator during the first inertia phase
(Continued)

time period when the cooperative control in which the input torque to the continuously variable transmission is greater than the predetermined value is judged.

6 Claims, 8 Drawing Sheets

(51) Int. Cl.
   *F16H 37/02* (2006.01)
   *F16H 61/662* (2006.01)
(58) Field of Classification Search
   USPC .......................................... 74/335, 721, 745
   See application file for complete search history.

(56) References Cited

U.S. PATENT DOCUMENTS

| | | | |
|---|---|---|---|
| 5,024,638 A | 6/1991 | Sakakibara et al. | |
| 5,080,639 A | 1/1992 | Sakakibara et al. | |
| 2004/0102267 A1 | 5/2004 | Murakami et al. | |
| 2005/0202912 A1 | 9/2005 | Tay | |
| 2005/0277502 A1 | 12/2005 | Wood | |
| 2007/0117664 A1 | 5/2007 | Shioiri et al. | |
| 2009/0082174 A1* | 3/2009 | Ikeda ................... | F16H 59/72 477/98 |
| 2009/0082931 A1* | 3/2009 | Ikeda ................... | F16H 59/72 701/51 |
| 2010/0075801 A1 | 3/2010 | Suzuki et al. | |
| 2010/0075799 A1 | 5/2010 | Suzuki et al. | |
| 2010/0248886 A1 | 9/2010 | Jozaki et al. | |
| 2010/0248895 A1* | 9/2010 | Jozaki ................ | F16H 61/66259 477/44 |
| 2011/0015033 A1 | 1/2011 | Nonomura et al. | |
| 2011/0015836 A1 | 1/2011 | Takahashi et al. | |
| 2011/0015839 A1 | 1/2011 | Takahashi et al. | |
| 2012/0059559 A1 | 3/2012 | Tanaka et al. | |
| 2012/0059571 A1 | 3/2012 | Yamada et al. | |
| 2012/0060485 A1 | 3/2012 | Yamada et al. | |
| 2012/0060486 A1 | 3/2012 | Yamada et al. | |
| 2012/0083977 A1 | 4/2012 | Tanaka et al. | |
| 2014/0207348 A1 | 7/2014 | Wakayama et al. | |
| 2014/0342876 A1 | 11/2014 | Tanaka et al. | |
| 2015/0133257 A1 | 5/2015 | Uchino et al. | |
| 2016/0102741 A1 | 4/2016 | Uchino et al. | |
| 2016/0109000 A1 | 4/2016 | Uchino et al. | |
| 2016/0290457 A1 | 10/2016 | Walter | |
| 2017/0211691 A1 | 7/2017 | Takahashi et al. | |

OTHER PUBLICATIONS

US Notice of Allowance issued in U.S. Appl. No. 15/021439 dated Jun. 18, 2018, 8 pages.
U.S. Appl. No. 15/021,439, filed Mar. 11, 2016, Jatco Ltd.; Nissan Motor Co., Ltd.

* cited by examiner

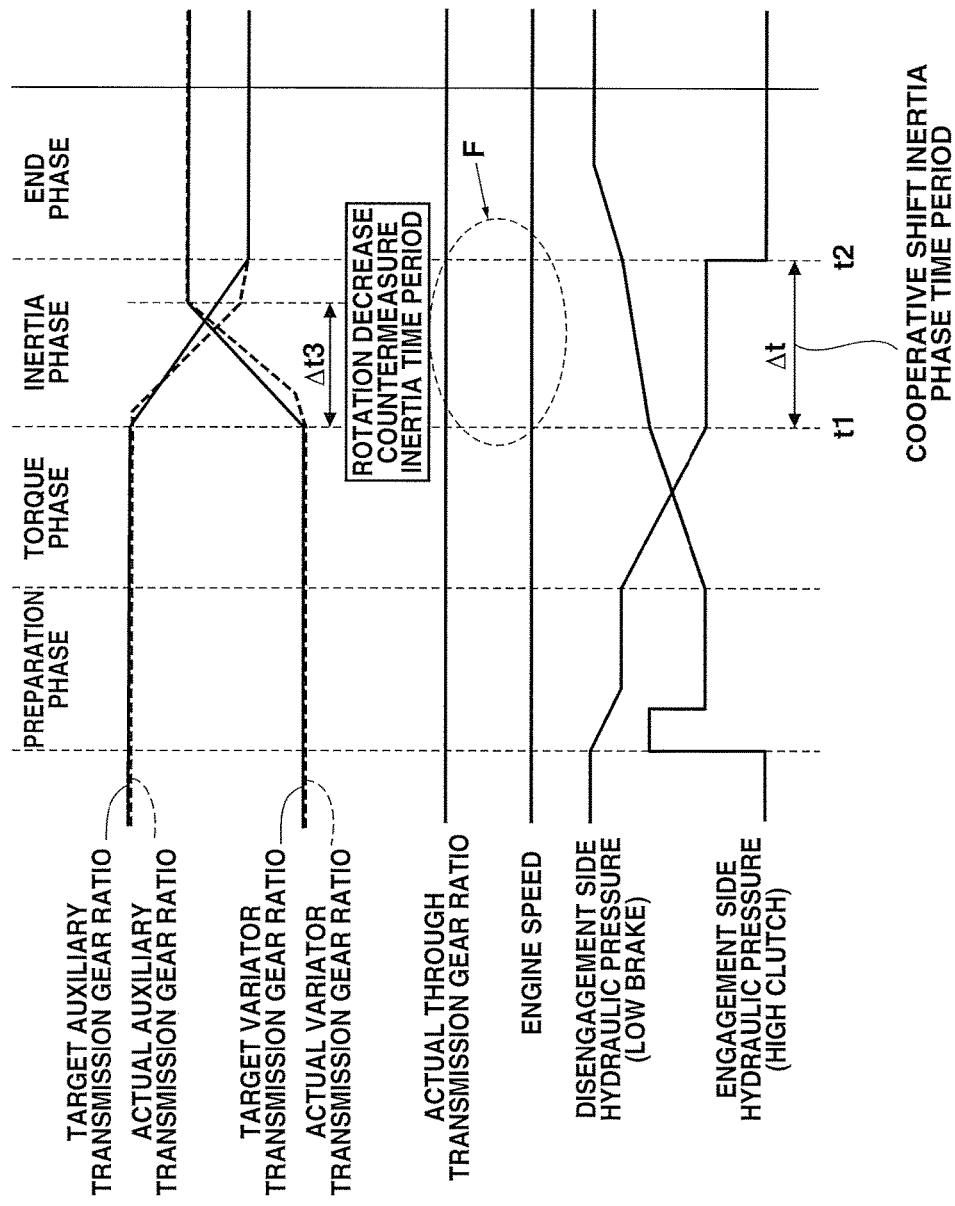

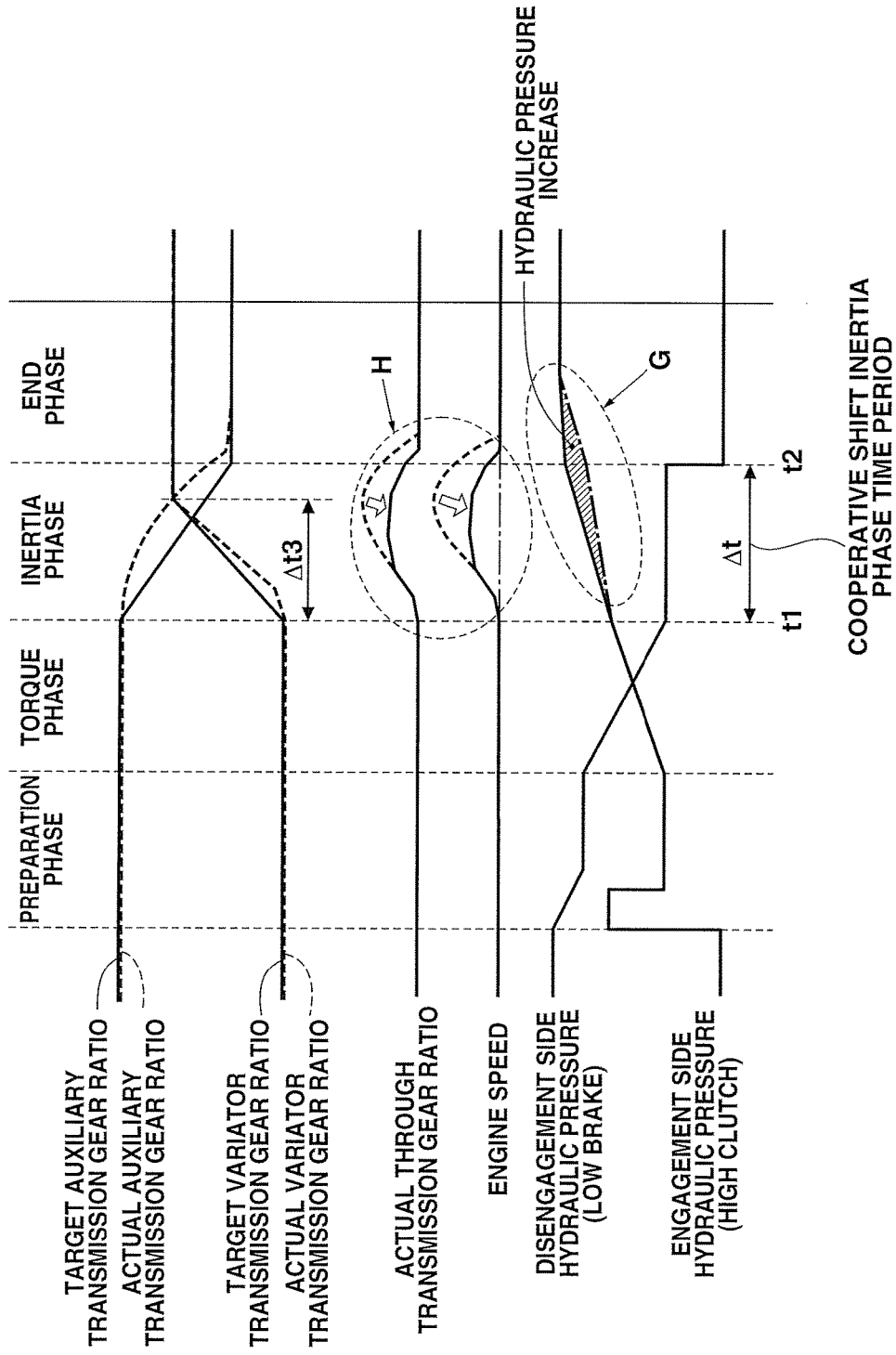

CONTROL DEVICE FOR CONTINUOUSLY VARIABLE TRANSMISSION EQUIPPED WITH AUXILIARY TRANSMISSION

TECHNICAL FIELD

This invention relates to a control device of a continuously variable transmission with an auxiliary transmission which is configured to perform a cooperative shift of an auxiliary transmission mechanism and a variator when there is a shift judgment with a shift of the auxiliary transmission mechanism.

BACKGROUND ART

Conventionally, there is known a control device of a continuously variable transmission with an auxiliary transmission which performs a cooperative control by which a variator and a stepped transmission mechanism are simultaneously shifted (cf. for example, patent document 1).

In this case, "the cooperative control" is a shift by which a transmission gear ratio of the variator is varied in a direction opposite to a variation direction of the transmission gear ratio of the auxiliary transmission mechanism when a gear stage of the auxiliary transmission mechanism is varied. By the shift by this cooperative control, it is possible to suppress the sudden variation of the transmission gear ratio (hereinafter, referred to as "through transmission gear ratio"). It is possible to decrease the shift shock before and after the shift by the auxiliary transmission mechanism, and to suppress the unnatural feeling to the driver.

In this conventional device, in the cooperative control with the shift of the auxiliary transmission mechanism in the region (the low vehicle speed, the low opening degree) in which the input torque to the continuously variable transmission is relatively small, the variation of the engine speed before and after the shift is small relative to a region (the high vehicle speed and the high opening degree) in which the input torque is relatively large. With this, the feedback control may not function as desired. As the countermeasure, the cooperative shift inertia phase time period of the entire transmission is set. The cooperative control is performed so that the two shifts are finished during the cooperative shift inertia phase time period.

However, even when the cooperative shift inertia phase time period is set, the actual transmission gear ratio does not follow the through transmission gear ratio due to the variation of the hydraulic pressure and so on. The cooperative control may be thrown into disorder. In particular, in a case of the upshift in which the inertia progress speed of the variator is slow and the inertia progress speed of the auxiliary transmission mechanism is fast, the clutch capacity of the auxiliary transmission mechanism becomes excessively much. The transmission input rotation speed (=the driving source rotation speed such as the engine speed) is decreased.

It is, therefore, an object of the present invention to provide a control device with an auxiliary transmission which is devised to solve the above-described problems, and to suppress a variation of a transmission input rotation speed, and to improve drivability at a cooperative control with the shift of the auxiliary transmission mechanism.

PRIOR ART DOCUMENT

Patent Document

Patent Document 1: Japanese Patent Application Publication No. H5-79554

SUMMARY OF THE INVENTION

For attaining the above-described objects, in the present invention, a control device for a continuously variable transmission with an auxiliary transmission which is mounted to a vehicle, and which includes a variator arranged to continuously vary a transmission gear ratio, and an auxiliary transmission mechanism that is disposed in series with the variator, and that has a first shift stage being a forward shift stage, and a second shift stage being the forward shift stage, and having a transmission gear ratio smaller than a transmission gear ratio of the first shift stage, the control device comprises:

a cooperative control means configured to perform a cooperative control to shift the auxiliary transmission mechanism, and to shift the variator in a direction opposite to a shift direction of the auxiliary transmission mechanism when the shift stage of the auxiliary transmission mechanism is varied, the cooperative control means including an inertia phase time period setting control section configured to set a first inertia phase time period which is a cooperative shift inertia phase time period of an overall transmission, and a second inertia phase time period which is shorter than the first inertia phase time period, the cooperative control means being configured to shift the auxiliary transmission mechanism during the first inertia phase time period, and to shift the variator during the second inertia phase time period, when the cooperative control in which an input torque to the continuously variable transmission is equal to or smaller than a predetermined value is judged.

Accordingly, when the cooperative control in which the input torque to the continuously variable transmission is equal to or smaller than the predetermined value, the shift of the auxiliary transmission is performed during the first inertia phase time period, and the shift of the variator is performed during the second inertia phase time period which is shorter than the first inertia phase time period.

That is, the feedback control may not function as desired since the variation of the transmission input rotations before and after the shift is small at the shift at which in which the input torque to the continuously variable transmission is equal to or smaller than the predetermined value. In particular, when the inertia progress speed of the variator becomes slower than the inertia progress speed of the auxiliary transmission at the depression upshift, the clutch capacity of the auxiliary transmission mechanism becomes excessive, so that the transmission input rotation speed is decreased.

On the other hand, the inertia phase necessary time period of the variator is shortened relative to the inertia phase necessary time period of the auxiliary transmission mechanism, by setting the second inertia phase time period which is shorter than the first inertia phase time period, in addition to the first inertia phase time period which is the cooperative inertia phase time period. Accordingly, in the inertia phase of the cooperative shift, the clutch capacity of the auxiliary transmission mechanism does not become much, and it is possible to suppress the variation of the transmission input rotation speed.

Therefore, it is possible to suppress the variation of the transmission input rotation speed at the cooperative control with the shift of the auxiliary transmission mechanism, and to improve the drivability.

BRIEF DESCRIPTION OF DRAWINGS

FIG. 7 is a time chart showing characteristics of an auxiliary shift state, an accelerator opening degree, a vehicle acceleration, an actual variator transmission gear ratio, a target variator transmission gear ratio, a control variator transmission gear ratio, a target auxiliary transmission gear ratio, an actual auxiliary transmission gear ratio, a desired target transmission gear ratio, an actual through transmission gear ratio, and a variator transmission gear ratio deviation, which represent a 1→2 depression upshift cooperative control that is performed in a transmission controller of the first embodiment.

FIG. 8 is a time chart showing characteristics of an auxiliary shift state, an accelerator opening degree, a vehicle acceleration, an actual variator transmission gear ratio, a target variator transmission gear ratio, a control variator transmission gear ratio, a target auxiliary transmission gear ratio, an actual auxiliary transmission gear ratio, a desired target transmission gear ratio, an actual through transmission gear ratio, and a variator transmission gear ratio deviation, when a sudden increase of the engine speed is generated during the 1→2 depression upshift non-cooperative control that is performed in the transmission controller of the first embodiment.

DESCRIPTION OF EMBODIMENTS

Hereinafter, a structure is explained. A preferred embodiment to attain a control device of a continuously variable transmission with an auxiliary transmission according to the present invention is explained based on an embodiment shown in a first embodiment.

First Embodiment

First, the structure is explained.

The structure of the control device of the continuously variable transmission with the auxiliary transmission according to the first embodiment is explained as to "Overall System Configuration", "Shift Control Configuration by Shift Map", "Cooperative Control Configuration of Auxiliary Transmission Mechanism and Variator", and "Depression Upshift Cooperative Control Configuration".

[Overall System Configuration]

Figure 1:
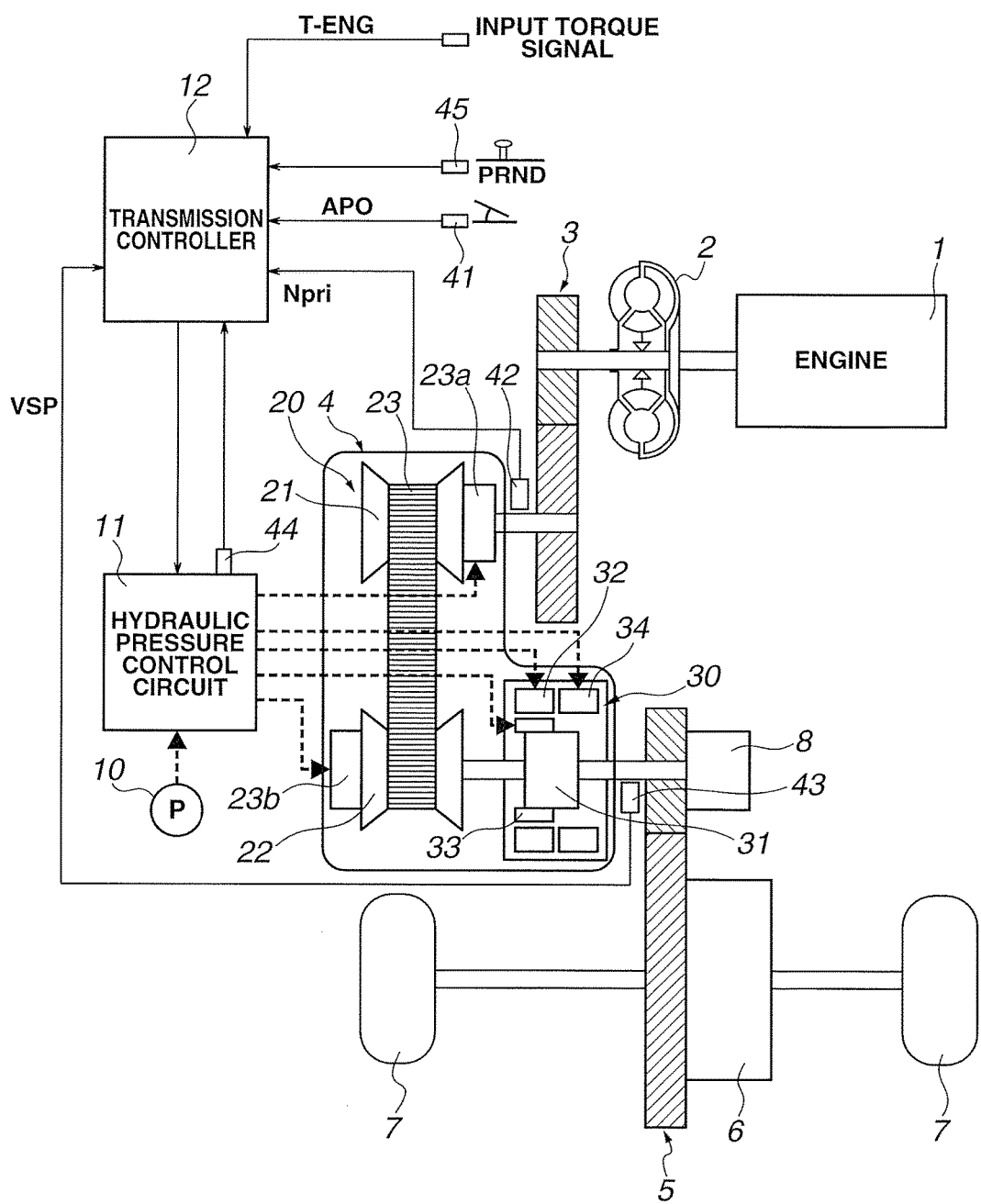
FIG. 1 is an overall view showing a schematic configuration of a vehicle mounted with a continuously variable transmission with an auxiliary transmission to which a control device according to a first embodiment is applied.
Figure 2:
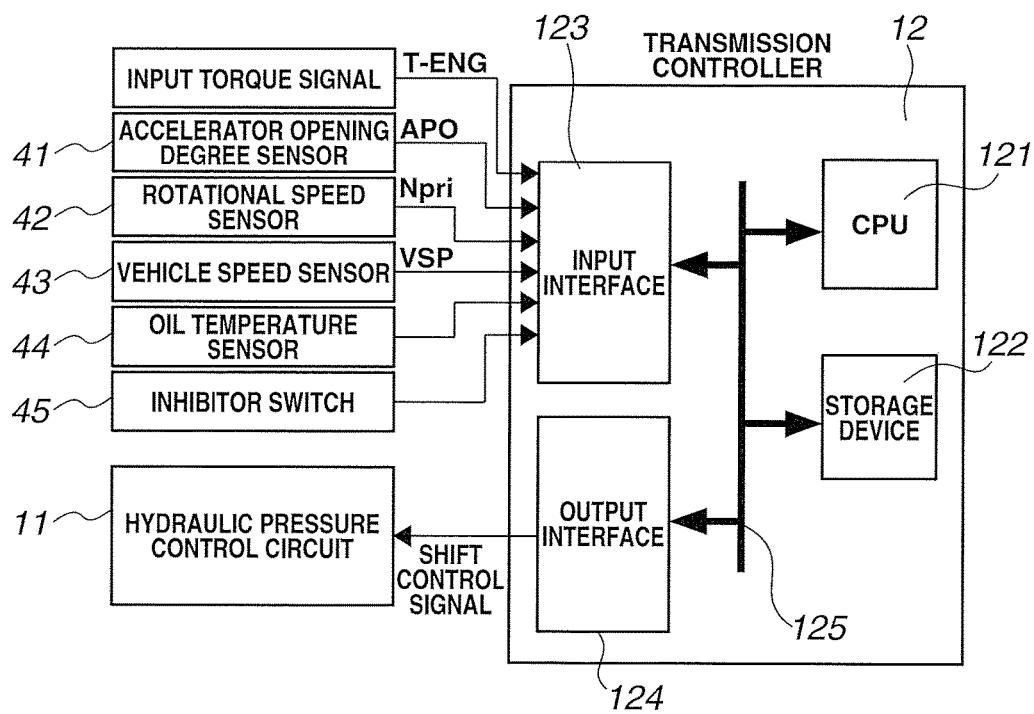
FIG. 2 is a block diagram showing an internal structure of a transmission controller of the first embodiment.

FIG. 1 is an overall view showing a schematic configuration of a vehicle mounted with a continuously variable transmission with an auxiliary transmission to which a control device according to a first embodiment is applied. FIG. 2 is a block diagram showing an internal structure of a transmission controller of the first embodiment. In below illustrations, a "transmission gear ratio" of a transmission mechanism is a value obtained by dividing an input rotational speed of the transmission mechanism by an output rotational speed of the transmission mechanism. Moreover, a "lowest transmission gear ratio" means a maximum transmission gear ratio of the transmission mechanism. A "highest transmission gear ratio" means a minimum transmission gear ratio of the transmission mechanism.

The vehicle mounted with the continuously variable transmission with the auxiliary transmission includes an engine 1 serving as a power source. An output rotation of engine 1 is transmitted to driving wheels 7 through a torque converter 2 with a lockup clutch, a first gear train 3, a continuously variable transmission (hereinafter, referred to simply as a transmission 4), a second gear train 5, and a final reduction gear 6. The vehicle further includes a parking mechanism 8 provided to the second gear train 5, and arranged to mechanically lock an output shaft of transmission 4 during parking so that the output shaft of transmission 4 cannot rotate.

Moreover, the vehicle includes an oil pump 10 arranged to be driven by using a part of the power of engine 1; a hydraulic pressure control circuit 11 arranged to regulate a hydraulic pressure from oil pump 10, and to supply the regulated hydraulic pressure to various parts of transmission 4; and a transmission controller 12 configured to control hydraulic pressure control circuit 11. Hereinafter, respective configurations are explained.

Transmission 4 includes a continuously variable transmission mechanism (hereinafter, referred to as a variator 20), and an auxiliary transmission mechanism 30 disposed in series with variator 20. Here, "in series with" represents that auxiliary transmission mechanism 30 is disposed in series with variator 20 in an identical power transmitting path. Auxiliary transmission mechanism 30 may be connected directly with the output shaft of variator 20, like this embodiment. Alternatively, auxiliary transmission mechanism 30 may be connected with the output shaft of variator 20 through other transmission mechanism or other power transmitting mechanism (for example, gear train).

Variator 20 is a belt type continuously variable transmission mechanism including a primary pulley 21, a secondary pulley 22, a V belt 23 wound around primary pulley 21 and secondary pulley 22. Each of primary and secondary pulleys 21 and 22 includes a fixed conical disc; a movable conical disc disposed relative to the fixed conical disc so that respective sheave surfaces thereof confront each other so as to form a V groove between the fixed conical disc and the movable conical disc; and one of hydraulic cylinders 23a and 23b each of which is disposed behind one of the movable conical discs, and which is arranged to move the movable conical disc in an axial direction. By adjusting the hydraulic pressures supplied to hydraulic cylinders 23a and 23b, a width of the V groove is varied, so that contact radii between V belt 23 and pulleys 21, 22 are varied. Consequently, a transmission gear ratio vRatio of variator 20 is continuously varied.

Auxiliary transmission mechanism 30 is a transmission mechanism having two forward shift stages and one reverse shift stage. Auxiliary transmission mechanism 30 includes a Ravigneaux type planetary gear mechanism 31 in which careers of two planetary gears are connected; and a plurality of frictional engagement elements (a Low brake 32, a High clutch 33, and a Rev (Reverse) brake 34) connected with a plurality of rotational elements constituting Ravigneaux type planetary gear mechanism 31, and arranged to vary connection states with the rotational elements. A shift stage of auxiliary transmission mechanism 30 is varied by varying engagement/disengagement states of frictional engagement elements 32-34 by regulating the hydraulic pressures supplied to frictional engagement elements 32-34. For example, the shift stage of auxiliary transmission mechanism 30 becomes a first speed by engaging Low brake 32, and by disengaging High clutch 33 and Rev brake 34. The shift stage of auxiliary transmission mechanism 30 becomes a second speed which has a transmission gear ratio smaller than that of the first speed, by engaging High clutch 33, and by disengaging Low brake 32 and Rev brake 34. Moreover, the shift stage of auxiliary transmission mechanism 30 becomes a reverse speed by engaging Rev brake 34, and by disengaging Low brake 32 and High clutch 33. Hereinafter, when the shift stage of auxiliary transmission mechanism 30 is the first speed, it is represented by "transmission 4 is a low speed mode". When the shift stage of auxiliary transmission mechanism 30 is the second speed, it is represented by "transmission 4 is a high speed mode".

As shown in FIG. 2, transmission controller 12 includes a CPU 121, a storage device 122 including a RAM and a ROM, an input interface 123, an output interface 124, and a bus 125 connecting these components to each other.

Input interface 123 receives an output signal of an accelerator opening sensor 41 arranged to sense a depression opening degree of an accelerator pedal (hereinafter, referred to as an accelerator opening APO), an output signal of a rotational speed sensor 42 arranged to sense an input rotational speed of transmission 4 (=a rotational speed of primary pulley 21, hereinafter, referred to as a primary rotational speed Npri), an output signal of a vehicle speed sensor 43 arranged to sense a running speed of the vehicle (hereinafter, referred to as a vehicle speed VSP), an output signal of an oil temperature sensor 44 arranged to sense an oil temperature of transmission 4, an output signal of an inhibitor switch 45 arranged to sense a position of a select lever, and a torque signal T-ENG which is an output torque signal of the engine 1.

Storage device 122 stores a shift control program of transmission 4, and a shift map (FIG. 3) used by this shift control program. CPU 121 reads the shift control program stored in storage device 122. CPU 121 carries out this shift control program to perform various calculations of the various signals inputted through input interface 123, and generates a shift control signal. CPU 121 outputs this shift control signal through output interface 124 to hydraulic pressure control circuit 11. The various values used by the calculation of CPU 121 and the results of the calculation of CPU 121 are stored in storage device 122.

Hydraulic pressure control circuit 11 includes a plurality of fluid passages and a plurality of hydraulic pressure control valves. Hydraulic pressure control circuit 11 is configured to control the plurality of the hydraulic pressure control valves based on the shift control signal from transmission controller 12, and thereby to switch supply passages of the hydraulic pressure. Moreover, hydraulic pressure control circuit 11 is configured to adjust a necessary hydraulic pressure from the hydraulic pressure generated in oil pump 10, and to supply this necessary hydraulic pressure to the various parts of the transmission 4. With this, the transmission gear ratio vRatio of variator 20 and the shift stage of auxiliary transmission mechanism 30 are varied, and the shift of transmission 4 is performed.

[Shift Control Configuration by Shift Map]

Figure 3:
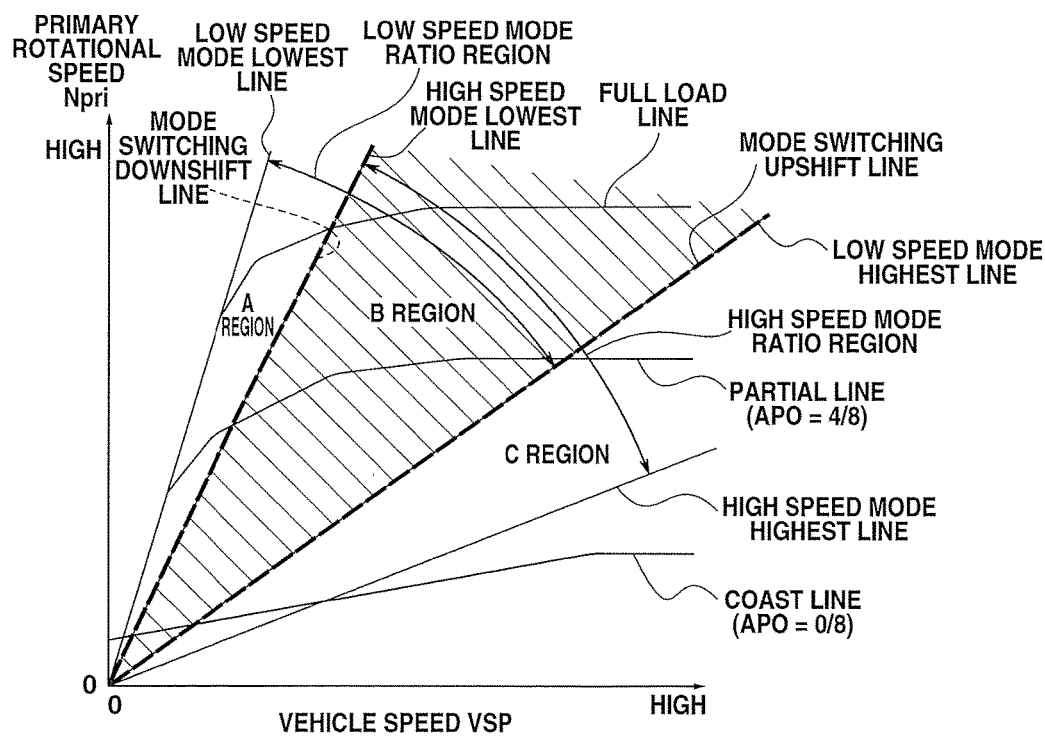
FIG. 3 is a shift map diagram showing one example of a shift map stored in a storage device of the transmission controller of the first embodiment.

FIG. 3 shows one example of the shift map stored in storage device 122 of transmission controller 12. Hereinafter, a shift control configuration is explained by a shift map is explained.

In this shift map, an operating point of transmission 4 is determined based on vehicle speed VSP and primary rotational speed Npri in the shift map shown in FIG. 3. An inclination of a line connecting the operating point of transmission 4 and a zero point of the shift map at a left lower corner represents the transmission gear ratio of transmission 4 (overall transmission gear ratio obtained by multiplying transmission gear ratio vRatio of variator 20 by transmission gear ratio subRatio of auxiliary transmission mechanism 30, hereinafter, referred to as a through transmission gear ratio Ratio). In this shift map, a shift line is set at each of accelerator openings APO, like the conventional belt type continuously variable transmission. The shift of transmission 4 is performed in accordance with the shift line selected in accordance with accelerator opening APO. For the sake of simplicity, FIG. 3 shows a full load line (a shift line at accelerator opening APO=8/8), a partial line (a shift line at accelerator opening APO=4/8), and a coast line (a shift line at accelerator opening APO=0) only.

When transmission 4 is in the low speed mode, transmission 4 can be shifted between a low speed mode lowest line obtained by maximizing transmission gear ratio vRatio of variator 20, and a low speed mode highest line obtained by minimizing transmission gear ratio vRatio of variator 20. In this case, the operating point of transmission 4 is moved within an A region and a B region. On the other hand, when transmission 4 is in the high speed mode, transmission 4 can be shifted between a high speed mode lowest line obtained by maximizing transmission gear ratio vRatio of variator 20, and a high speed mode highest line obtained by minimizing transmission gear ratio vRatio of variator 20. In this case, the operating point of transmission 4 is moved within the B region and a C region.

The transmission gear ratio of each of the shift stages of auxiliary transmission mechanism 30 is set so that the transmission gear ratio corresponding to the low speed mode highest line (a low speed mode highest transmission gear ratio) becomes smaller than the transmission gear ratio corresponding to the high speed mode lowest line (a high speed mode lowest transmission gear ratio). With this, a low speed mode ratio region which is a region of through transmission gear ratio Ratio of transmission 4 that can be attained in the low speed mode, and a high speed mode ratio region which is a region of through transmission gear ratio Ratio of transmission 4 that can be attained in the high speed mode are partially overlapped with each other. When the operating point of transmission 4 is in the B region which is sandwiched by the high speed mode lowest line and the low speed mode highest line, transmission 4 can select either the low speed mode or the high speed mode.

Transmission controller 12 sets, as a desired through transmission gear ratio DRatio, the through transmission gear ratio corresponding to vehicle speed VSP and accelerator opening APO (a driving state of the vehicle), with reference to this shift map. This desired through transmission gear ratio DRatio is a target value that through transmission gear ratio Ratio should finally attain in this driving state. Moreover, transmission controller 12 sets a target through transmission gear ratio tRatio which is a transient target value that through transmission gear ratio Ratio follows the desired through transmission gear ratio DRatio by a desired response characteristic. Transmission controller 12 controls variator 20 and auxiliary transmission mechanism 30 so that through transmission gear ratio Ratio corresponds to target through transmission gear ratio tRatio.

In this shift map, a mode switching upshift line for performing the upshift of auxiliary transmission mechanism 30 (a 1→2 shift line of auxiliary transmission mechanism 30) is set to be substantially overlapped with the low speed mode highest line. The through transmission gear ratio corresponding to the mode switching upshift line is substantially equal to a low speed mode highest transmission gear ratio. Moreover, in the shift map, a mode switching downshift line for performing the downshift of auxiliary transmission mechanism 30 (a 2→1 shift line of auxiliary transmission mechanism 30) is set to be substantially overlapped with the high speed mode lowest line. The through transmission gear ratio corresponding to the mode switching downshift line is substantially equal to a high speed mode lowest transmission gear ratio.

When the operating point of transmission 4 crosses the mode switching upshift line or the mode switching downshift line, that is, when the target through transmission gear ratio Ratio of the transmission 4 is varied to be across mode switching transmission gear ratio mRatio, or when the target through transmission gear ratio Ratio corresponds to the mode switching transmission gear ratio mRatio, transmission controller 12 performs the mode switching shift control. In this mode switching shift control, transmission controller 12 performs the shift of auxiliary transmission mechanism 30, and performs a coordinative shift (cooperative shift) to cooperate the two shift operations to vary transmission gear ratio vRatio of variator 20 in a direction opposite to a direction in which transmission gear ratio subRatio of auxiliary transmission mechanism 30 is varied.

In this coordinative control, when target through transmission gear ratio Ratio of transmission 4 is moved across the mode switching upshift line or corresponds to the mode switching upshift line, transmission controller 12 outputs the 1→2 upshift judgment, and changes the shift stage of auxiliary transmission mechanism 30 from the first speed to the second speed. At the same time, transmission controller 12 varies the transmission gear ratio vRatio of variator 20 from the highest transmission gear ratio to the lowest transmission gear ratio. Conversely, when through transmission gear ratio tRatio of transmission 4 is moved across the mode switching downshift line or corresponds to the mode switching downshift line, transmission controller 12 outputs the 2→1 downshift judgement, and changes the shift stage of auxiliary transmission mechanism 30 from the second speed to the first speed. At the same time, transmission controller 12 varies the transmission gear ratio vRatio of variator 20 from the lowest transmission gear ratio to the highest transmission gear ratio.

The coordinative shift to vary the transmission gear ratio vRatio of the variator 20 is performed at the mode switching upshift or the mode switching downshift for suppressing the unnatural feeling of the driver by the variation of the input rotation which is caused by unevenness of through transmission gear ratio Ratio of transmission 4. Moreover, it is possible to ease the shift shock of auxiliary transmission mechanism 30 by shifting auxiliary transmission mechanism 30 in this state.

[Cooperative Control Configuration of Auxiliary Transmission Mechanism and Variator]

Figure 4:
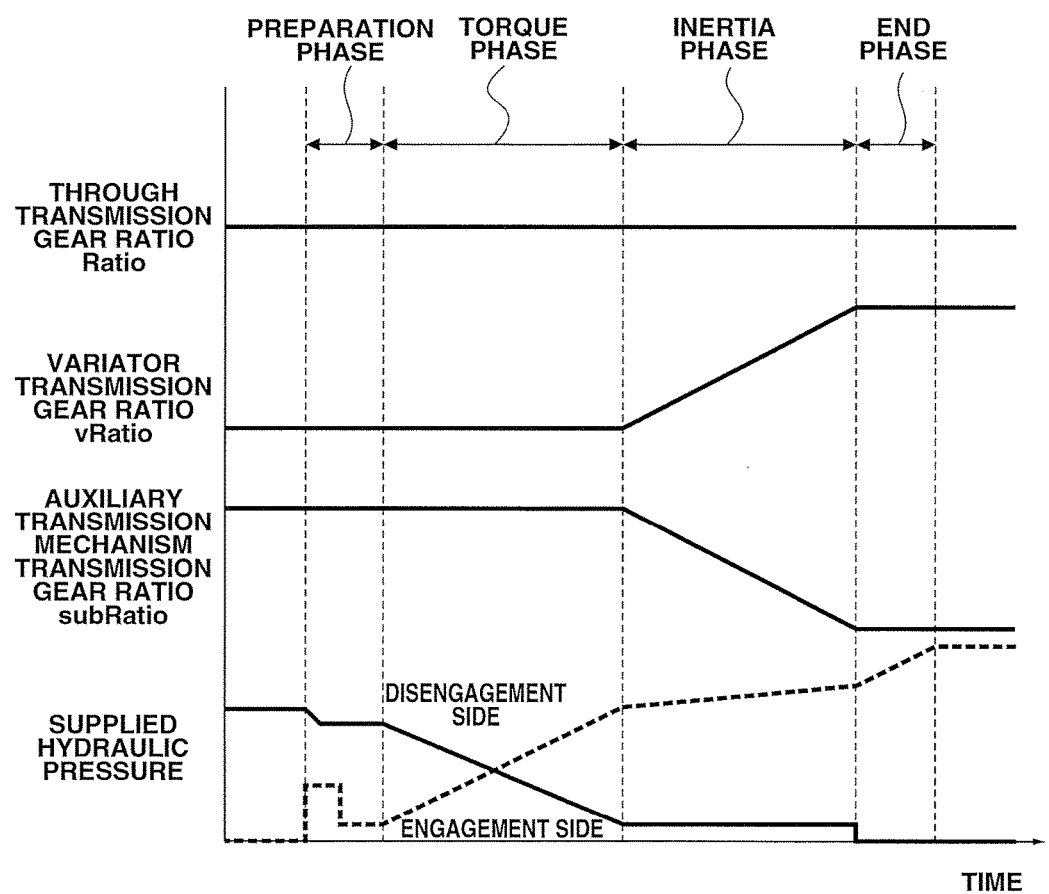
FIG. 4 is a time chart for illustrating a cooperative control which is performed in the transmission controller of the first embodiment, and by which the through transmission gear ratio is maintained constant.

FIG. 4 is a time chart showing the cooperative control operation. The cooperative shift of the auxiliary transmission mechanism 30 is constituted by four phases of a preparation phase, a torque phase, an inertia phase, and an end phase.

In the preparation phase, the hydraulic pressure is previously charged to the engagement side frictional engagement elements. The preparation phase is a phase in which the engagement side frictional engagement element is standby in a state just before the engagement. The engagement side frictional engagement element is the frictional engagement element engaged with the shift stage after the shift. The engagement side frictional engagement element is the High clutch 33 at the 1→2 upshift. The engagement side frictional engagement element is the Low brake 32 at the 2→1 downshift.

The torque phase is a phase in which the hydraulic pressure supplied to the disengagement side frictional engagement element is decreased, and in which the shift stage arranged to transmit the torque is shifted from the shift stage of the disengagement side frictional engagement element to the shift stage of the engagement side frictional engagement element. The disengagement side frictional engagement element is the Low brake 32 at the 1→2 upshift. The disengagement side frictional engagement element is the High clutch 33 at the 2→1 downshift.

The inertia phase is a phase in which the transmission gear ratio subRatio of the auxiliary transmission mechanism 30 is varied from the transmission gear ratio of the shift stage before the shift, to the transmission gear ratio after the shift. The transmission controller 12 in the inertia phase generates the target transmission gear ratio of the auxiliary transmission mechanism 30 to smoothly shift from the transmission gear ratio of the shift stage before the shift of the auxiliary transmission 30 to the transmission gear ratio of the shift stage after the shift, and to shift at a shift speed that is substantially identical to the shift speed of the variator 20. The transmission controller 12 calculates the target transmission gear ratio tvRatio of the variator 20 by dividing the target through transmission gear ratio tRatio by the target transmission gear ratio tsubRatio of auxiliary transmission mechanism 30. Then, the transmission controller 12 controls the variator 20 so that the transmission gear ratio vRatio of the variator 20 corresponds to the target transmission gear ratio tvRatio. The transmission controller 12 performs the feedback control of the hydraulic pressure supplied to the Low brake 32 and the High clutch 33 so that the transmission gear ratio subRatio of the auxiliary transmission mechanism 30 corresponds to the target transmission gear ratio tsubRatio. With this, the target through transmission gear ratio tRatio is attained, and the transmission gear ratios of the variator 20 and the auxiliary transmission mechanism 30 are controlled in the opposite directions.

The end phase is a phase in which the hydraulic pressure supplied to the disengagement side frictional engagement element is zero to fully disengage the disengagement side frictional engagement element, and in which the hydraulic pressure supplied to the engagement side frictional engagement element is increased to fully engage the engagement side frictional engagement element.

These four phases are generated in the order opposite to the above-order at the upshift (automatic upshift) which is caused by increasing the vehicle speed by depressing the accelerator pedal by the driver, and at the downshift (the coast downshift) which is caused by decreasing the vehicle speed while the driver releases the foot from the accelerator pedal. However, the order of the torque phase and the inertia phase becomes opposite at the upshift (foot-release upshift) which is caused when the driver releases the foot from the accelerator pedal, and at the downshift (the depression downshift including the kick-down shift) which is caused when the drive depresses the accelerator pedal.

The through transmission gear ratio is not varied before and after the cooperative shift in FIG. 4. This is because the target through transmission gear ratio tRatio before and after the cooperative shift is maintained constant. The cooperative control in this specification is not limited to this embodiment. The cooperative control is an overall control operation configured to vary the transmission gear ratio of the variator 20 in a direction opposite to the variation direction of the transmission gear ratio of the auxiliary transmission 30, and thereby to control the through transmission gear ratio Ratio to the target transmission gear ratio Ratio (the cooperative control means).

[Depression Upshift Cooperative Control Configuration]

Figure 5:
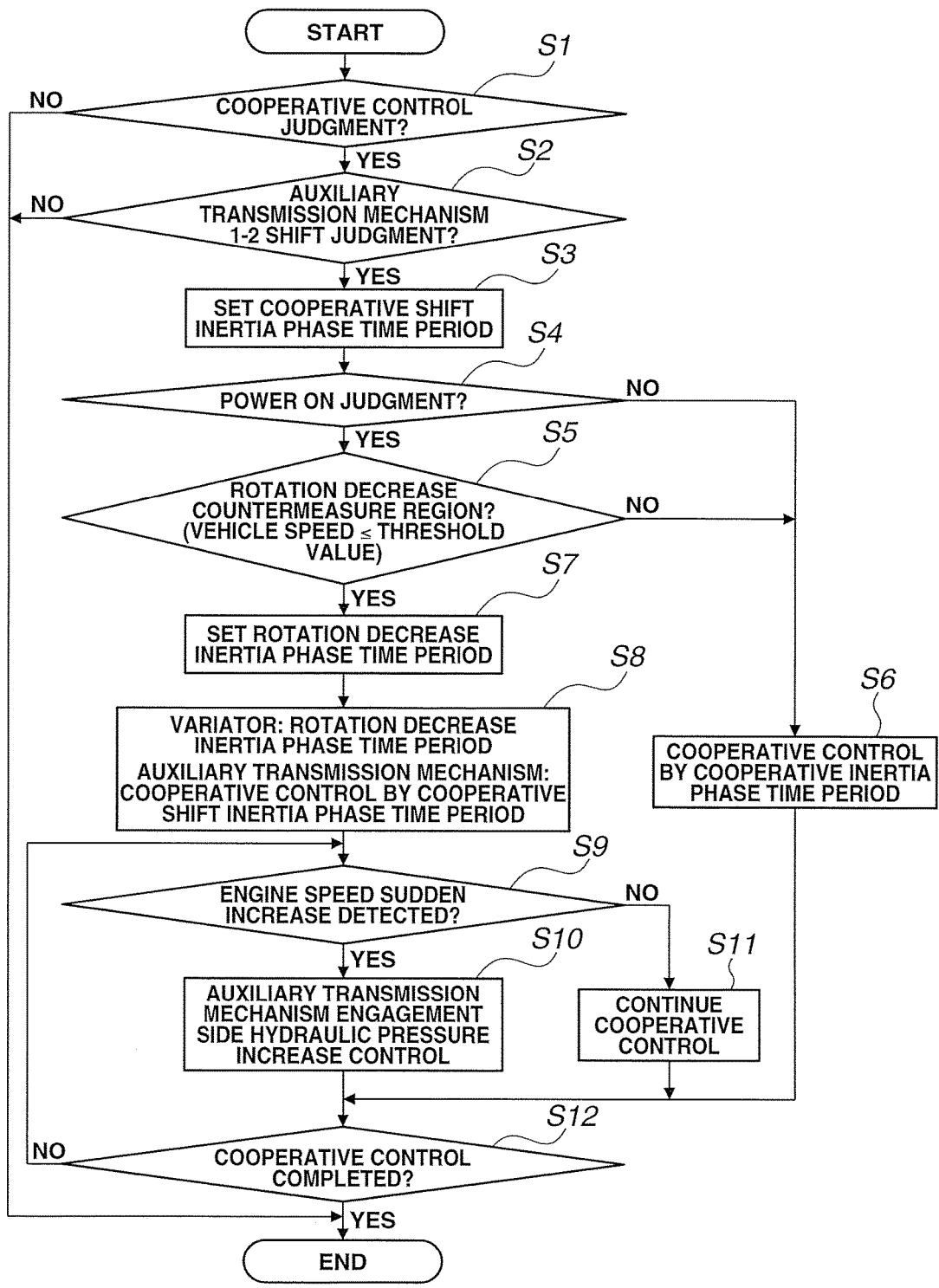
FIG. 5 is a flowchart showing a flow of a depression upshift cooperative control operation which is performed in the transmission controller of the first embodiment.

FIG. 5 shows a flow of a depression upshift cooperative control operation which is performed in the transmission controller 12 (the cooperative control means). Hereinafter, steps of FIG. 5 which represent the depression upshift cooperative control operation configuration.

At step S1, it is judged whether or not it is the cooperative control judgment (determination). When the answer is Yes (the cooperative control judgment), the process proceeds to step S2. When the answer is No (the non-cooperative control judgment), the process proceeds to the end.

In this case, the non-cooperative control is a control in which the cooperative shift of the variator 20 is not performed at the depression upshift with the shift of the auxiliary transmission mechanism 30.

Subsequently to the judgment of the cooperative control judgment at step S1, at step S2, it is judged whether or not it is the 1→2 upshift judgment of the auxiliary transmission mechanism 30. When the answer is Yes (1→2 upshift judgment), the process proceeds to step S3. When the answer is No (other than the 1→2 upshift judgment), the process proceeds to the end.

In this case, the 1→2 upshift judgment at auxiliary transmission mechanism 30 is judged in a case where the operating point determined by the vehicle speed VSP and the primary rotation speed Npri is moved across the mode switching shift line in the shift map shown in FIG. 3.

Subsequently to the judgment of the 1→2 upshift judgment at step S2, at step S3, a cooperative shift inertia phase time period (first inertia phase time period) for an overall transmission is set when the upshift of the auxiliary transmission mechanism and the downshift of the variator 20 are performed. The process proceeds to step S4 (inertia phase time period setting control section).

In this case, the cooperative shift inertia phase time period is set as an inertia phase target necessary time period in the cooperative shift by the upshift at the auxiliary transmission mechanism 30 and the downshift at the variator 20.

Subsequently to the setting of the cooperative shift inertia phase time period at step S3, at step S4, it is judged whether or not it is the power ON judgment. When the answer is Yes (the power ON judgment), the process proceeds to step S5. When the answer is No (the power OFF judgment), the process proceeds to step S6.

In this case, the power ON judgment is judged when the accelerator opening degree APO satisfies 0<APO≤APO1 (APO1 is a low opening degree judgment value), or when the input torque signal T-ENG inputted from the engine to the transmission controller satisfies 0<T-ENG<T-ENG1 (T-ENG is a low torque judgment value). That is, the power ON is judged when the input torque to the transmission 4 is in a relatively small region.

Subsequently to the judgment of the power ON judgment at step S4, at step S5, it is judged whether or not the vehicle state is in a rotation decrease countermeasure region (judged by the vehicle speed VSP). When the answer is Yes (it is in the rotation decrease countermeasure region), the process proceeds to step S7. When the answer is No (it is not in the rotation decrease countermeasure region), the process proceeds to step S6.

In this case, it is judged that the vehicle state is in the rotation decrease countermeasure region when the vehicle is in a driving state in which it is supposed that in the inertia phase, the actual shift progress speed of the variator 20 is slow with respect to the actual shift progress speed of the auxiliary transmission mechanism 30, the clutch capacity of the auxiliary transmission mechanism 30 becomes excessive, so that the engine speed which is the transmission input rotation speed is decreased. In particular, it is judged by the vehicle speed. The low vehicle speed region in which the vehicle speed VSP is equal to or lower than the low vehicle speed judgment value is the rotation decrease countermeasure region in which the actual shift progress speed of the variator 20 becomes slow.

Subsequently to the power OFF judgment at step S4, or the judgment that it is in the rotation decrease countermeasure region at step S5, at step S6, the cooperative control is performed during the cooperative shift inertia phase time period. The process proceeds to step S12.

At step S6, the cooperative control is performed. In this cooperative control, the auxiliary transmission mechanism 30 is upshifted during the cooperative shift inertia time period, and the variator 20 is downshifted during the same cooperative shift inertia phase time period.

Subsequently to the judgment that it is in the rotation decrease countermeasure time period at step S5, at step S7, the rotation decrease countermeasure inertia phase time period (the second inertia phase time period) which is shorter than the cooperative shift inertia phase time period is set. The process proceeds to step S8 (inertia phase time period setting control section).

In this case, the rotation decrease countermeasure inertia phase time period is set as a target time period of the inertia phase when the variator 20 is downshifted. This rotation decrease countermeasure inertia phase time period is set so that the inertia phase necessary time period when the variator 20 is downshifted becomes equal to or shorter than the inertia phase necessary time period when the auxiliary transmission mechanism 30 is upshifted by setting the cooperative shift inertia phase time period to the target time period.

Subsequently to setting of the rotation decrease countermeasure inertia phase time period at step S7, at step S8, below-described cooperative shift control is performed. In this cooperative shift control, the auxiliary transmission mechanism 30 is upshifted during the cooperative shift inertia phase time period, and the variator 20 is downshifted during the rotation decrease countermeasure inertia phase time period (<the cooperative shift inertia phase time period). The process proceeds to step S9.

Subsequently to the cooperative control which are performed in the auxiliary transmission mechanism 30 and the variator 20 whose the target inertia phase time periods are different from each other at step S8, or the judgement that the cooperative control shift is not finished at step S12, at step S9, it is judged whether or not the sudden increase of the engine speed is sensed. When the answer is Yes (the engine speed sudden increase is sensed), the process proceeds to step S10. When the answer is No (the engine speed sudden increase is not sensed), the process proceeds to step S11.

In this case, the engine speed sudden increase is, for example, in a case where the rotation increase amount from the engine speed before the inertia phase is equal to or greater than a predetermined sudden increase judgment value, the sudden increase of the engine speed is sensed.

Subsequently to the judgment of the detection of the engine speed sudden increase at step S9, at step S10, the cooperative control of the auxiliary transmission mechanism 30 and the variator 20 continues, and the engagement side hydraulic pressure (High clutch hydraulic pressure) of the auxiliary transmission mechanism 30 is controlled to be increased. The process proceeds to step S12.

Subsequently to the judgment that the engine speed sudden increase is not sensed at step S9, at step S11, the cooperative control in which the auxiliary transmission mechanism 30 and the variator 20 have the different target inertia phase time periods at step S8 continues. The process proceeds to step S12.

Subsequently to the cooperative controls which are performed, respectively, at steps S6, S10, and S11, at step S12, it is judged whether or not the cooperative control shift is finished. When the answer is Yes (the cooperative control shift is finished), the process proceeds to the end. When the answer is No (the cooperative control shift is not finished), the process returns to step S9.

Next, operations are explained.

The operations of the control device of the continuously variable transmission with the auxiliary transmission mechanism according to the first embodiment are explained as to [Problems of Comparative Example], [Operation of Engine Speed Decrease Prevention Operation at Depression Upshift Cooperative Control], and [Engine Sudden Increase Prevention Operation at Depression Upshift Cooperative Control].

[Problems of Comparative Example]

First, preconditions are explained. In the continuously variable transmission with the auxiliary transmission, when the judgement of the depression upshift with the shift of the auxiliary transmission mechanism is performed, the cooperative control of the auxiliary transmission mechanism and the variator is performed.

In particular, the sudden variation of the through transmission gear ratio of the overall transmission is suppressed for suppressing the unnatural feeling to the driver, such as the generation of the shift shock before and after the shift in the auxiliary transmission mechanism.

In the vehicle to which the continuously variable transmission with the auxiliary transmission is mounted, when the cooperative control is performed, the target transmission gear ratios are set, respectively, for the variator and the auxiliary transmission mechanism. Then, the feedback control is performed. This feedback control is performed so that the actual transmission gear ratios follow the respective target transmission gear ratios by controlling the pulley pressure of the variator, and the clutch hydraulic pressures that constitute the shift stages (the gear stages) of the auxiliary transmission mechanism.

In the cooperative control with the upshift of the auxiliary transmission mechanism in a region (the low vehicle speed and the low opening degree) in which the input torque to the continuously variable transmission is relatively small, the variation of the transmission input rotation speed (=the engine speed) before and after the speed and the high opening degree) in which the input shift is smaller relative to the region (the high vehicle torque is relatively large. Accordingly, the feedback control may not function as desired.

As the countermeasure, when the input torque is in the relatively small region, the cooperative shift inertia phase time period is set as the target inertia phase time period of the overall transmission. The control is performed so that the two shifts are finished during the cooperative shift inertia phase time period.

However, the variation of the actual shift of the auxiliary transmission mechanism may be varied at higher speed with respect to the target inertia variation of the auxiliary transmission mechanism, due to the variation of the hydraulic pressure sensitivity (the relationship between the hydraulic pressure and the torque capacity of the frictional elements) relating to the frictional elements of the auxiliary transmission mechanism, and the hysteresis which is the deviation of the actual hydraulic pressure and the command hydraulic pressure. In the variation of the actual shift of the variator, the delay of the followability of the variator with respect to the target transmission gear ratio is generated. In this case, even when the cooperative shift inertia phase time period is set, the actual transmission gear ratio does not follow the through transmission gear ratio due to the variation of the hydraulic pressure, and so on. The cooperative control is thrown into disorder.

In particular, the clutch capacity of the auxiliary transmission mechanisms becomes excessive when the actual shift progress speed of the variator is slower with respect to the target transmission gear ratio, and the actual inertia progress of the auxiliary transmission mechanism is fast. The engine speed is decreased. By this decrease of the engine speed, the engine speed may be decreased to the release rotation speed of the lockup clutch. In this case, the lockup clutch is disengaged for preventing the engine stall.

In the continuously variable transmission with the auxiliary transmission which performs the cooperative control, the comparative example is a configuration in which the only cooperative shift inertia phase time period of the overall transmission is set at the judgment of the depression upshift by the upshift of the auxiliary transmission mechanism and the downshift of the variator. The depression upshift control operation with the shift of the auxiliary transmission mechanism in this comparative example is explained based on the time chart shown in FIG. 6.

Figure 6:
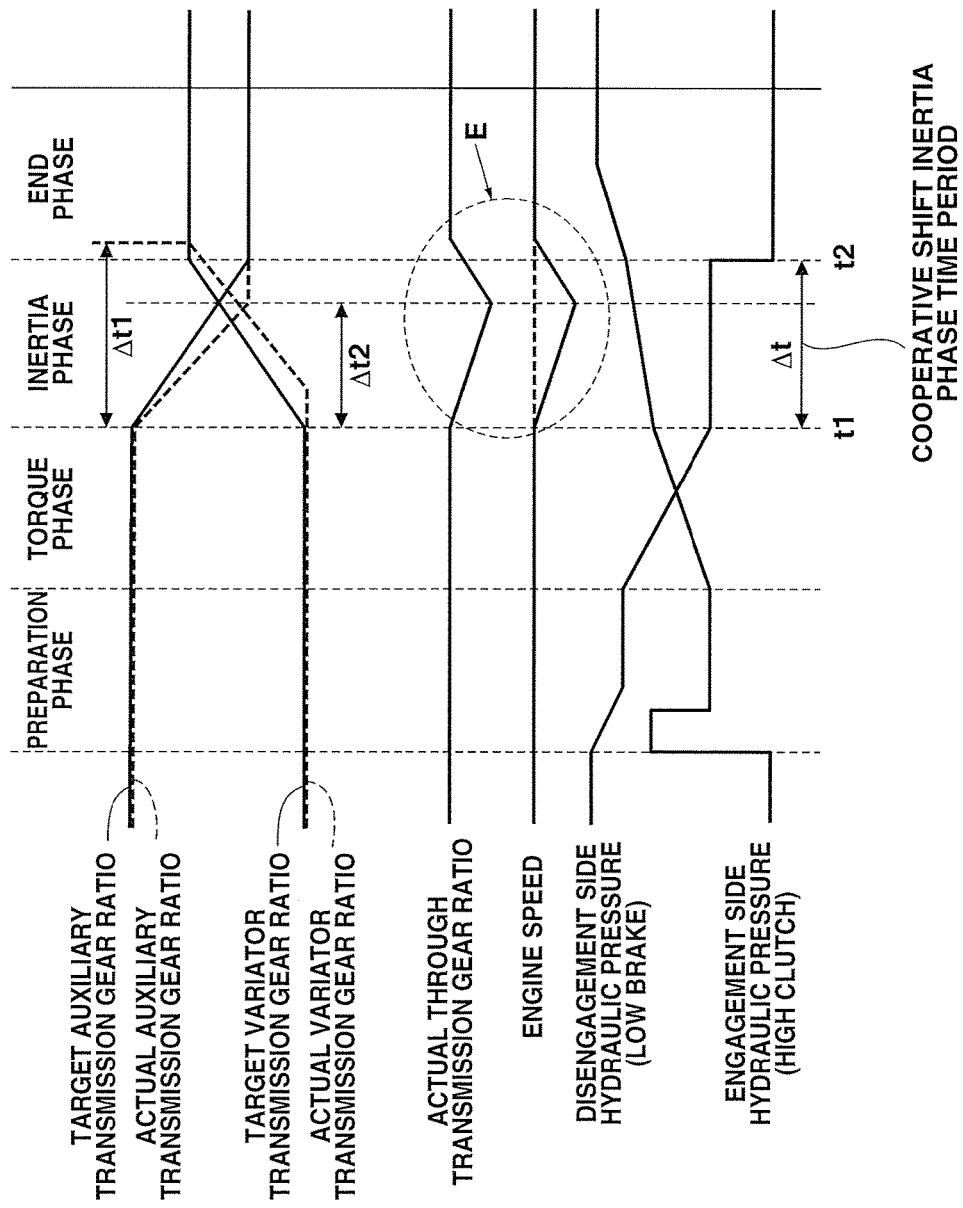
FIG. 6 is a time chart showing characteristics of a target auxiliary transmission gear ratio, an actual auxiliary transmission gear ratio, a target variator transmission gear ratio, an actual variator transmission gear ratio, an actual through transmission gear ratio, an engine speed, a disengagement side hydraulic pressure (Low brake), and an engagement side hydraulic pressure (High clutch), which represent a 1→2 depression upshift cooperative control that is performed in a transmission controller of a comparative example.

A time period from the time t1 to the time t2 of FIG. 6 is the cooperative shift inertia phase time period $\Delta t$. When the variator is downshifted by setting this cooperative shift inertia phase time period $\Delta t$ to the target time period, it becomes the inertia phase necessary time period $\Delta t1$ ($>\Delta t$) of the variator in a case where the progress speed of the actual transmission gear ratio of the variator is slower with respect to the progress speed of the target transmission gear ratio. On the other hand, when the auxiliary transmission mechanism is upshifted by setting the cooperative inertia phase time period $\Delta t$ to the target time period, it becomes the inertia phase necessary time period $\Delta t2$ ($<\Delta t$) of the auxiliary transmission mechanism in a case where the actual inertia progress of the auxiliary transmission mechanism is fast. In this way, in a case where the cooperative control of the variator and the auxiliary transmission mechanism is thrown into disorder, the High clutch capacity by the engagement side hydraulic pressure of the auxiliary transmission mechanism becomes excessive. As shown in an E portion of FIG. 6, the actual through transmission gear ratio and the engine speed are decreased.

For preventing this decrease of the engine speed, it is conceivable that the cooperative control is prohibited. However, in a case where the cooperative control is prohibited, the through transmission gear ratio of the overall transmission is varied at the depression upshift, so that the drivability is decreased.

[Operation (Function) of Engine Speed Decrease Prevention at Depression Upshift Cooperative Control]

The engine speed decrease prevention operation (function) at the depression upshift cooperative control with the shift of the auxiliary transmission mechanism according to the first embodiment is explained based on the flowchart shown in FIG. 5, and the time chart shown in FIG. 7.

First, when the cooperative control judgment condition and the depression 1→2 upshift judgment condition are satisfied, and at least one of the power ON judgment condition and the rotation decrease countermeasure region condition is not satisfied, the process proceeds along step S1→step S2→step S3→step S4 (→step S5)→step S6 in the flowchart of FIG. 5. At step S3, the cooperative shift inertia phase time period is set. At step S6, the cooperative control is performed so that the auxiliary transmission mechanism 30 is upshifted during the cooperative shift inertia phase time period, and the variator 20 is downshifted during the same cooperative shift inertia phase time period.

While (As long as) the engine speed sudden increase is not sensed, the process proceeds from step S6 along step S12→step S9→step S11. The flow of step S12→step S9→step S11 is repeated until the cooperative control shift is finished. That is, the cooperative control in which the auxiliary transmission mechanism 30 is upshifted during the cooperative shift inertia phase time period, and the variator 20 is downshifted during the same cooperative shift inertia phase time period continues.

On the other hand, when the cooperative control judgment condition, the depression 1→2 upshift judgment condition, the power ON judgement, and the rotation decrease countermeasure are satisfied, in the flowchart of FIG. 5, the process proceeds along step S1→step S2→step S3→step S4→step S5→step S7→step S8. At step S3, the cooperative shift inertia phase time period is set. At step S7, the rotation decrease countermeasure inertia phase time period is set. At step S8, the cooperative control in which the auxiliary transmission mechanism 30 is upshifted during the cooperative shift inertia phase time period, and the variator 20 is downshifted during the rotation decrease countermeasure inertia phase time period (<the cooperative shift inertia phase time period) is performed.

While (As long as) the engine speed sudden increase is not sensed, the process proceeds from step S8 along step S9→step S11→step S12. The flow of step S9→step S11→step S12 is repeated until the cooperative control shift is finished. That is, the cooperative control in which the auxiliary transmission mechanism 30 is upshifted during the cooperative shift inertia phase time period, and the variator 20 is downshifted during the rotation decrease countermeasure inertia phase time period continues. Hereinafter, the engine speed decrease prevention operation at the depression upshift control with the shift of the auxiliary transmission mechanism according to the first to embodiment is explained based on the time chart shown in FIG. 7.

A time period from time t1 to time t2 of FIG. 7 is the cooperative shift inertia phase time period $\Delta t$. When the variator 20 is downshifted by setting the rotation decrease countermeasure inertia phase time period $\Delta t3$ (<$\Delta t$) which is shorter than this cooperative shift inertia phase time period $\Delta t$, to the target time period, the inertia phase necessary time period of the variator 20 substantially corresponds to the rotation decrease countermeasure inertia phase time period $\Delta t3$ by increasing the shift progress speed by increasing the shift control gain.

On the other hand, when the auxiliary transmission mechanism 30 is upshifted by setting the cooperative shift inertia phase time period $\Delta t$ to the target time period, it becomes substantially rotation decrease countermeasure inertia phase time period $\Delta t3$ (<$\Delta t$) even when the actual inertia progress of the auxiliary transmission mechanism 30 becomes fast. In this way, in a case where the two shifts are finished at substantially same timing by differentiating the target inertia phase time periods in the cooperative control of the variator 20 and the auxiliary transmission mechanism 20, the High clutch capacity by the engagement side hydraulic pressure of the auxiliary transmission mechanism 30 does not become excessively much or excessively little. As shown in an F portion of FIG. 7, the actual through transmission gear ratio and the engine speed are not varied before and after the inertia phase. The actual through transmission gear ratio and the engine speed are maintained to the constant value.

As described above, in the first embodiment, when it is judged that it is the depression upshift in which the input torque to the transmission 4 is equal to or smaller than the predetermined value, the auxiliary transmission mechanism 30 is upshifted during the inertia phase time period, and the variator 30 is downshifted during the rotation decrease countermeasure inertia phase time period which is shorter than the cooperative inertia phase time period.

That is, at the depression upshift in which the input torque to the transmission 4 is equal to or smaller than the predetermined value, the variation of the transmission input rotation speed before and after the shift is small, so that the feedback control may not function as desired. In particular, when the inertia progress speed of the variator 20 becomes slow with respect to the inertia progress speed of the auxiliary transmission mechanism 30, the clutch capacity of the auxiliary transmission mechanism 30 becomes excessive, so that the transmission input rotation speed is decreased.

On the other hand, the inertia phase necessary time period of the variator 20 is shortened with respect to the necessary time period of the auxiliary transmission mechanism 30, by setting the rotation decrease countermeasure inertia phase time period which is shorter than the cooperative shift inertia phase time period in addition to the cooperative shift inertia phase time period. Accordingly, in the inertia phase of the depression cooperative upshift, the clutch capacity of the auxiliary transmission mechanism 30 does not become excessive. The decrease of the transmission input rotation speed is suppressed.

Moreover, the variation of the through transmission gear ratio of the entire transmission is suppressed at the depression upshift, since the cooperative control is not prohibited. The drivability is improved.

Therefore, at the depression upshift with the shift of the auxiliary transmission mechanism 30, it is possible to suppress the decrease of the transmission input rotation speed, and to improve the drivability. In particular, the decrease of the engine speed is suppressed in the engine vehicle. Accordingly, the disengagement of the lockup clutch for preventing the engine stall is not needed.

In the first embodiment, when the rotation decrease countermeasure region condition which is the driving region in which it is supposed that the downshift progress speed of the variator 20 is slower than the upshift progress speed of the auxiliary transmission mechanism 30, and that the input rotation speed to the transmission 4 is decreased is satisfied, the cooperative control performed by the different target inertia phase time periods is employed.

That is, when both of the power ON judgment condition of step S4 in FIG. 5 and the rotation decrease countermeasure condition of step S5 in FIG. 5 are satisfied, the process proceeds to step S7. The rotation decrease countermeasure inertia phase time period is set.

Accordingly, the rotation decrease countermeasure time period is set only in a case where the rotation decrease countermeasure region condition by which the transmission input rotation speed is likely to be decreased when the cooperative control is performed by using the cooperative shift inertia phase time period. Therefore, it is possible to surely suppress the decrease of the transmission input rotation speed while suppressing the frequency of setting the rotation decrease countermeasure inertia phase time period.

[Operation of Prevention of Engine Speed Sudden Increase at Depression Upshift Cooperative Control]

As described above, the process repeats the flow of step S9→step S11→step S12 in the flowchart of FIG. 5, during the depression upshift cooperative control, irrespective of the setting of the rotation decrease countermeasure inertia phase time period. When the engine rotation speed sudden increase is sensed at step S9, the process proceeds from step S9 to step S10. At step S10, the engagement side hydraulic pressure (High clutch hydraulic pressure) is increased while the cooperative control of the auxiliary transmission mechanism 30 and the variator 20 continues. By increasing the load resistance added to the engine 1 by the increase of the engagement side hydraulic pressure, the sudden increase of the engine speed is suppressed. Hereinafter, the operation of the prevention of the engine speed sudden increase at the depression upshift control with the shift of the auxiliary transmission in the first embodiment is explained based on the time chart shown in FIG. 8.

A time period from time t1 to time t2 in FIG. 8 is the cooperative shift inertia phase time period Δt. When the variator 20 is downshifted by setting the rotation decrease countermeasure inertia phase time period Δt3 (<Δt) which is shorter than this cooperative shift inertia phase time period Δt, to the target time period, the inertia phase necessary time period of the variator 20 substantially corresponds to the rotation decrease countermeasure inertia phase time period Δt3 by increasing the shift progress speed by increasing the feedback gain.

On the other hand, when the auxiliary transmission mechanism 30 is upshifted by setting the cooperative shift inertia phase time period Δt to the target time period, the actual inertia progress of the auxiliary transmission mechanism 30 is delayed and stagnant. With this, the load resistance added to the engine 1 is decreased by deficiency of the clutch capacity. With this, the sudden increase of the engine speed is started to be increased. Then, when the sudden increase of the engine speed is sensed, the engagement side hydraulic pressure (High clutch hydraulic pressure) of the auxiliary transmission mechanism 30 is controlled to be increased as shown in a G portion of FIG. 8. The deficiency of the clutch capacity of the auxiliary transmission mechanism 30 is dissolved, so that the load resistance added to the engine 1 is increased. As shown in an H portion of FIG. 8, it is possible to suppress the increase of the actual through transmission gear ratio, and to suppress the sudden increase the engine speed.

In the first embodiment, when the sudden increase of the engine speed is sensed during the cooperative control in which the auxiliary transmission mechanism 30 is upshifted during the cooperative inertia phase time period, and in which the variator 20 is downshifted during the rotation decrease countermeasure inertia phase time period, the hydraulic pressure of the High clutch 33 of the auxiliary transmission mechanism 30 is controlled to be increased.

That is, there is concern about the stagnation of the actual inertia of the auxiliary transmission 30 by setting the target inertia time period to the rotation decrease countermeasure time period of the variator 20, and by setting the target inertia time period to the cooperative shift inertia phase time period of the auxiliary transmission mechanism 30. When the sudden increase of the engine speed by the stagnation of the actual inertia of the auxiliary transmission mechanism 30 is sensed, the hydraulic pressure of the High clutch 33 of the auxiliary transmission mechanism 30 is controlled to be increased. That is, the hydraulic pressure command of the High clutch 33 of the auxiliary transmission 30 is not varied until the sudden increase of the engine speed is sensed.

Accordingly, it is possible to suppress the sudden increase of the engine speed due to the actual inertia stagnation of the auxiliary transmission mechanism 30 while the cooperative control in which the auxiliary transmission mechanism 30 and the variator 20 have the different inertia time periods is maintained at the maximum degree.

Next, effects are explained.

In the control device for the continuously variable transmission with the auxiliary transmission according to the first embodiment, it is possible to obtain the following effects.

(1) A control device for a continuously variable transmission (transmission 4) with an auxiliary transmission which is mounted to a vehicle, and which includes a variator 20 arranged to continuously vary a transmission gear ratio, and an auxiliary transmission mechanism 30 that is disposed in series with the variator 20, and that has a first shift stage being a forward shift stage, and a second shift stage being the forward shift stage, and having a transmission gear ratio smaller than a transmission gear ratio of the first shift stage, the control device including:

a cooperative control means configured to perform a cooperative control to shift the auxiliary transmission 30, and to shift the variator 20 in a direction opposite to a shift direction of the auxiliary transmission mechanism 30 when the shift stage of the auxiliary transmission mechanism 30 is varied, the cooperative control means (FIG. 5) including an inertia phase time period setting control section (S3, S7) configured to set a first inertia phase time period which is a cooperative shift inertia phase time period of an overall transmission, and a second inertia phase time period (rotation decrease countermeasure inertia phase time period) which is shorter than the first inertia phase time period, the cooperative control means (FIG. 5) being configured to shift the auxiliary transmission mechanism during the first inertia phase time period (the cooperative inertia phase time period), and to shift (downshift) the variator 20 during the second inertia phase time period (rotation decrease countermeasure inertia phase time period), when the cooperative control in which an input torque to the continuously variable transmission (transmission 4) is equal to or smaller than a predetermined value is judged.

Accordingly, it is possible to suppress the variation of the transmission input rotation speed at the cooperative control with the shift of the auxiliary transmission 30.

(2) The inertia phase time period setting section (S7 of FIG. 5) is configured to set the second inertia phase time period (the rotation decrease countermeasure inertia phase time period) which is shorter than the first inertia phase time period (the cooperative shift inertia phase time period) when a progress speed of the shift of the variator 20 is slower than a progress speed of the shift of the auxiliary transmission 30, and the vehicle is in a driving region in which it is supposed that the input rotation speed to the continuously variable transmission (the transmission 4) is decreased.

(3) The cooperative control means (FIG. 5) is configured to perform a input rotation speed increase suppressing control in which an engagement force of an engagement side frictional engagement element (High clutch 33) is increased (the engine speed sudden increase) when an increase of the input rotation speed to the continuously variable transmission (the transmission 4) is sensed (Yes at S9) during the cooperative control in which the auxiliary transmission mechanism 30 is shifted during the first inertia phase time period (the cooperative shift inertia phase time period), and the variator 20 is shifted during the second inertia phase time period (the rotation decrease countermeasure inertia phase time period) (S10).

Hereinabove, the control device of the continuously variable transmission with the auxiliary transmission according to the present invention is explained based on the first embodiment. However, the concrete configuration is not limited to this first embodiment. Variations and additions of the designs are permitted as long as it is not deviated from the gist of the present invention relating to the claims.

In the first embodiment, the depression upshift cooperative control is exemplified as the cooperative control means. However, the cooperative control means may be the depression downshift in which the input torque to the transmission is equal to or smaller than the predetermined value. In this case, it is possible to suppress the increase of the transmission input rotation speed, and to improve the drivability.

In the first embodiment, the variator 20 has a belt type continuously variable transmission mechanism. However, the variator 20 may be a continuously variable transmission mechanism in which a chain is wound around the pulleys 21 and 22, in place of the V belt 23. Moreover, the variator 20 may be a toroidal continuously variable transmission mechanism in which a power roller arranged to be tilted is disposed between an input disk and an output disk.

In the first embodiment, the auxiliary transmission mechanism 30 is a transmission mechanism having two shift stages of the first speed and the second speed which are the forward shift stages. However, the auxiliary transmission mechanism 30 may be a transmission mechanism having three or more shift stages which are the forward shift stages.

In the first embodiment, the auxiliary transmission mechanism 30 has the Ravigneaux type planetary gear mechanism. However, the auxiliary transmission mechanism 30 may be constituted by combining a normal planetary gear mechanism and frictional engagement elements, or may be constituted by a plurality of power transmitting paths constituted by a plurality of gear trains having different gear ratios, and frictional engagement elements arranged to switch these power transmitting paths.

In the first embodiment, the actuator arranged to displace movable conical plates of the pulleys 21 and 22 of the variator 20 in the axial direction has the hydraulic pressure cylinders 23a and 23b. However, the actuator is not limited to the actuator which is driven by the hydraulic pressure. The actuator of the variator may be an actuator arranged to be electrically driven.

In the first embodiment, the control device for the continuously variable transmission with the auxiliary transmission is applied to the engine vehicle. However, the control device for the continuously variable transmission with the auxiliary transmission according to the present invention is applicable to a hybrid vehicle to which the engine and the motor is mounted as the driving source, and an electric vehicle to which the motor is mounted as the driving source.

The invention claimed is:

1. A control device for a continuously variable transmission with an auxiliary transmission which is mounted to a vehicle, and which includes a variator arranged to continuously vary a transmission gear ratio, and an auxiliary transmission mechanism that is disposed in series with the variator, and that has a first shift stage being a forward shift stage, and a second shift stage being the forward shift stage, and having a transmission gear ratio smaller than a transmission gear ratio of the first shift stage, the control device comprising:

a cooperative control section configured to perform a cooperative control to shift the auxiliary transmission mechanism, and to shift the variator in a direction opposite to a shift direction of the auxiliary transmission mechanism when the shift stage of the auxiliary transmission mechanism is varied, the cooperative control section including an inertia phase time period setting control section configured to set a first inertia phase time period which is a cooperative shift inertia phase time period of an overall transmission, and a second inertia phase time period which is shorter than the first inertia phase time period, the cooperative control section being configured to shift the auxiliary transmission mechanism during the first inertia phase time period, and to shift the variator during the second inertia phase time period, when the cooperative control in which an input torque to the continuously variable transmission is equal to or smaller than a predetermined value in the cooperative control is judged, and the cooperative control section being configured to shift the auxiliary transmission mechanism during the first inertia phase time period, and to shift the variator during the first inertia phase time period when the cooperative control in which the input torque to the continuously variable transmission is greater than the predetermined value is judged.

2. The control device for the continuously variable transmission with the auxiliary transmission as claimed in claim 1, wherein the inertia phase time period setting section is configured to set the second inertia phase time period which is shorter than the first inertia phase time period when a progress speed of the shift of the variator is slower than a progress speed of the shift of the auxiliary transmission, and the vehicle is in a driving region when an input rotation speed to the continuously variable transmission is decreased.

3. The control device for the continuously variable transmission with the auxiliary transmission as claimed in claim 1, wherein the cooperative control section is configured to perform an input rotation speed increase suppressing control in which an engagement force of an engagement side frictional engagement element is increased when an increase of an input rotation speed to the continuously variable transmission is sensed during the cooperative control in which the auxiliary transmission mechanism is shifted during the first inertia phase time period, and the variator is shifted during the second inertia phase time period.

4. A control device for a continuously variable transmission with an auxiliary transmission which is mounted to a vehicle, and which includes a variator arranged to continuously vary a transmission gear ratio, and an auxiliary transmission mechanism that is disposed in series with the variator, and that has a first shift stage being a forward shift stage, and a second shift stage being the forward shift stage, and having a transmission gear ratio smaller than a transmission gear ratio of the first shift stage, the control device comprising:

a transmission controller configured to perform a cooperative control to shift the auxiliary transmission mechanism, and to shift the variator in a direction opposite to a shift direction of the auxiliary transmission mechanism when the shift stage of the auxiliary transmission mechanism is varied, set a first inertia phase time period which is a cooperative shift inertia phase time period of an overall transmission, and a second inertia phase time period which is shorter than the first inertia phase time period, cause the auxiliary transmission mechanism to shift during the first inertia phase time period, and cause the variator to shift during the second inertia phase time period, when the cooperative control in which an input torque to the continuously variable transmission is equal to or smaller than a predetermined value in the cooperative control is judged, and cause the auxiliary transmission mechanism to shift during the first inertia phase time period, and cause the variator to shift during the first inertia phase time period when the cooperative control in which the input torque to the continuously variable transmission is greater than the predetermined value is judged.

5. The control device for the continuously variable transmission with the auxiliary transmission as claimed in claim 4, wherein the transmission controller is further configured to set the second inertia phase time period which is shorter than the first inertia phase time period when a progress speed of the shift of the variator is slower than a progress speed of the shift of the auxiliary transmission, and the vehicle is in a driving region when an input rotation speed to the continuously variable transmission is decreased.

6. The control device for the continuously variable transmission with the auxiliary transmission as claimed in claim 4, wherein the transmission controller is further configured to perform an input rotation speed increase suppressing control in which an engagement force of an engagement side frictional engagement element is increased when an increase of an input rotation speed to the continuously variable transmission is sensed during the cooperative control in which the auxiliary transmission mechanism is shifted during the first inertia phase time period, and the variator is shifted during the second inertia phase time period.

* * * * *